Nov. 5, 1963
R. E. FUHRMAN ETAL
3,109,412
CALIBRATION ADJUSTMENT FOR DIALS AND THE LIKE
Filed Dec. 19, 1961
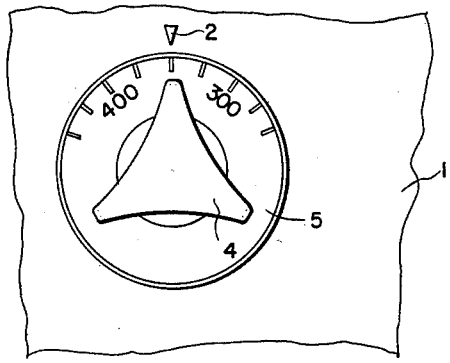
FIG. 1
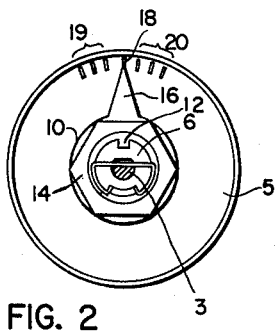
FIG. 2
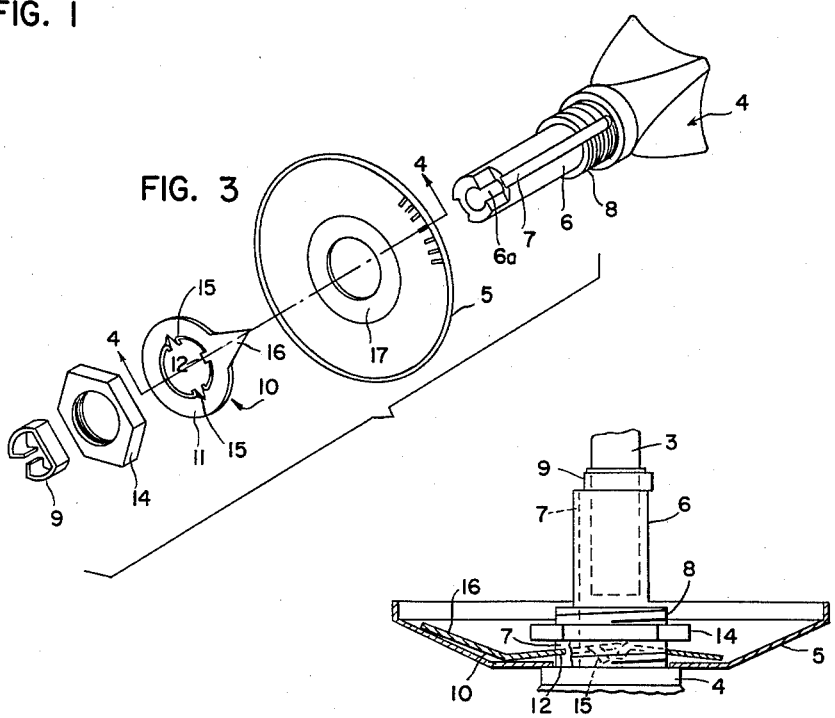
FIG. 3
FIG. 4
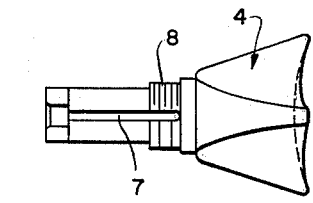
FIG. 5
INVENTORS
RICHARD E. FUHRMAN
SHERELL R. HUDDLESTON
BY
ATTORNEY

United States Patent Office 3,109,412
Patented Nov. 5, 1963

3,109,412
CALIBRATION ADJUSTMENT FOR DIALS
AND THE LIKE
Richard E. Fuhrman, Oak Park, and Sherell R. Huddleston, Oak Lawn, Ill., assignors to General Electric Company, a corporation of New York
Filed Dec. 19, 1961, Ser. No. 160,587
4 Claims. (Cl. 116—124)

This invention relates to condition responsive devices such as thermostats for the control of temperatures in cooking ovens, refrigerators and the like, and in particular relates to means for adjusting the setting dial to conform to the actual performance characteristics of the control device.

Coultrip U.S. Patent 2,179,281, patented November 7, 1939, for "Control Device" and assigned to our present assignee, discloses an adjustment knob having the dial integral therewith; said dial is operatively associated with the thermostat setting shaft by means of a shaft-mounted fitting having an axially extending lug which enters a hollow interior portion of the knob. This hollow portion is arranged to permit a relatively large rotational adjustment of the knob on the shaft. An adjustment plate removably mounted within the knob has a slot just wide enough to accommodate the passage of the lug, whereupon when it is necessary to relate the knob to the shaft in an angular position representative of the actual performance of the thermostat, the plate is removed from the knob, repositioned on the knob according to the estimated disparity between the initial setting and the performance of the thermostat, and then returned to the knob for reexamination. This Coultrip device has been satisfactory from the point of view of calibration as a part of manufacturing procedures, and has been used on hundreds of thousands of thermostats manufactured by our assignee. For the service man making adjustments in the home of the owner of the cooking appliance, however, it has proved to be unnecessarily complex for field calibrations, and in view of the ever-present pressure on manufacturing costs, too costly to manufacture and assemble for present economic conditions.

Our present invention provides a knob and dial adjustment arrangement which is far less expensive to manufacture and apply and is much easier for appliance service men to manipulate under field service conditions. In the latter situation, for example, the service man makes the calibration adjustment without removing the knob or the dial from the thermostat shaft. In a presently preferred embodiment the dial is structurally independent of the knob and has engraved on its inner face indicia showing the extent to which the dial must be rotated relative to the thermostat shaft to accomplish the necessary correlation between the temperature markings on the face of the dial and the operation of the thermostat at its calibration temperature. The thermostat knob has a shaft-like extension which fits non-rotatably on the thermostat shaft; we arrange on said knob extension a calibration pointer which performs a double function of establishing the extent to which the dail is to be rotated relative to the knob, and of providing means for subsequently securely fixing the dial against accidental rotation relative to the knob. For example, we secure the calibration device against rotation on the knob shaft as by a tongue and groove relation therebetween; we configurate the calibration device so that it will frictionally grip the inner surface of the dial; we provide a nut threaded on the knob shaft to urge the calibration device into such frictional engagement with the dial; and we configurate the calibration device so that it secures the nut against loosening when the thermostat is in use.

In accomplishing a calibration adjustment with our invention, the pointer of the calibration device is related to a standard index on the dial, and the nut made up sufficiently tight to permit the dial to be rotated on the knob shaft while not permitting it to be accidentally displaced after adjustment. The thermostat is then exposed to its standard calibration temperature, and the temperature at which it actually operates as represented by a standard checking thermometer, is noted. For example, the calibration temperature may be 350° Fahrenheit. The thermostat sensing element is placed in a bath or heat medium known to be at 350° F. The thermostat knob is then rotated from some lower setting until the 350° mark on its dial face registers with a fixed index. If the thermostat operates at a temperature other than its preestablished calibration temperature—for example, this would be manifest in an oven thermostat by the opening of the thermostat contacts—it would signify that the thermostat performance and the dial position were not in coordination. The thermostat shaft would be manually held against rotation and the dial manually moved in one or another direction until the proper correlation between the dial and the thermostat shaft had been attained. Only then would it be necessary to remove the knob from the thermostat shaft to permit the mechanic to tighten the locking nut to secure the dial in its adjustment position.

It is therefore an object of the invention to provide means whereby a thermostat dial may readily be adjusted to conform to the operational characteristics of a thermostat.

It is another object of the invention to provide a thermostat knob and dial assembly having improved means for adjustably securing the dial relative to the thermostat adjustment shaft.

It will, of course, be understood that our invention is useful with any type of condition responsive device or regulatory device, which has a dial or equivalent by means of which the user is enabled to select the condition at which the device is to operate. Examples of such devices are, among others, temperature control devices, pressure control devices, potentiometers and the like.

Other features and advantages of our invention will best be understood from the following detailed description of the presently preferred embodiment read in connection with the accompanying drawings in which:

FIG. 1 is a front view of an adjustment knob and dial of a temperature control device as it would appear on the control panel of an electric range and the like;

FIG. 2 is a rear view of the knob and dial with the shaft of the temperature control device shown in section;

FIG. 3 is an exploded perspective of the dial and thermostat knob assembly;

FIG. 4 is an enlarged side elevation of the components of FIG. 3 in assembled relation, with the dial and the calibration device shown in section on lines 4—4 of FIG. 3; and FIG. 5 is a plan view of the knob and its shaft showing the threading and the locking groove thereof.

Looking now at FIG. 1, a range backsplasher or control panel 1 has any suitable index marker 2 to serve as a reference point to permit the user to pre-select the operation temperature of a thermostat or the like (not shown). As is well understood in the art, thermostats such as that shown in the above noted Coultrip Patent 2,179,281, have an adjustment shaft on which a knob is mounted to permit the user manually to rotate the shaft; said knob has associated therewith a dial calibrated in degrees of temperature whereby when the knob and its dial are manually rotated until the desired dial calibration comes into registry with the fixed index, the thermostat will perform its intended function at that temperature.

In FIG. 2, a thermostat adjustment shaft 3 is shown in section.

In FIG. 1 the knob 4 represents the thermostat adjustment knob and the dial 5 is the temperature selection dial. The dial is of frusto-conical shape. The shaft portion 6 of the knob (FIG. 2) has a non-circular aperture 6a which non-rotatably accommodates the shaft 3 of the thermostat; and in FIG. 5 it is shown that the knob shaft 6 has an axial groove 7 and a threaded portion 8 which said groove intersects. The knob shaft may have a portion extending beyond the threaded portion; this is determined by the specific requirements of the thermostat mounting and is unimportant as respects our invention. As is conventional in the art, the thermostat shaft 3 is non-circular, at least at the portion thereof entering the knob shaft. To secure the shaft 3 frictionally within the knob shaft, a clip 9 is provided.

It is an important feature of our invention that the dial 5 is initially free to rotate on the knob shaft and is arranged to be held against rotation by a calibration device which maintains the dial securely fixed against such rotation. As shown in FIG. 3, the calibration device 10 has a hub portion 11 which encircles the shaft and has a key 12 which fits within the groove 7 of the shaft. The calibration device is arranged to be clamped against the inner face of the dial 5 by means of the lock nut 14. The sectional elevation of the calibration device in FIG. 4 discloses that its hub portion 11 is concavo-convex and that it has a "burr" 15 of which there are preferably two, diametrically opposed on the inner circular edge of the hub. The index pointer 16 of the calibration device is preferably sloped at not quite the slope of the inner face of the dial. It will further be understood that the calibration device is of a resilient metal stock.

The knob and its dial are assembled as indicated in FIGS. 3 and 4 with the concave base of the hub 11 facing the flat central portion 17 of the dial. When the nut 14 is tightened it will distort the hub so that the burrs 15 will bite into the adjacent surface of the dial and the tip of the pointer 16 will also have a frictional engagement therewith. The reaction of the hub portion of the calibration device will exert a rearward axial force against the lock nut itself, thus adequately maintaining the lock nut against loosening.

As shown in FIG. 2, the inner face of the dial has a marking 18 which corresponds to the dial marking identifying the temperature at which the thermostat calibration test is to be made. There are other groups of markings, 19, 20, respectively on the left and right hand side of marking 18 as viewed in FIG. 2. These markings provide adjustment or calibration guides. For example, if the marking 18 corresponds to 350° F., one of the adjacent groups will correspond to temperatures of 340°, 330°, 320° F. as the markings recede from the index mark 18; and the other group of markings will successively represent temperatures of 360°, 370° and 380° F.

When the dial is to be adjusted relative to the thermostat shaft (as represented by the knob shaft) the nut 14 is made not quite tight enough to preclude the manual rotation of the dial on the shaft but sufficiently tight to prevent accidental displacement of the dial following the calibration test.

The dial is initially set to have pointer 16 on the index 18 and the thermostat is exposed to the calibration temperature. With the 250° dial marking initially at the reference point (which in field calibration work would be the index 2 and in the factory, some other fixed index) the mechanic or service man rotates the dial in a clockwise direction as viewed in FIG. 1. If the thermostat operates when the 350° mark on the dial comes into registry with fixed index marker, the dial is in its proper relationship to the knob shaft. If operation of the thermostat occurs before the dial marker meets the reference index, it would mean that the dial is improperly positioned relative to the thermostat performance, whereupon the calibrator manually rotates the dial a few degrees in a clockwise direction as viewed in FIG. 1. He estimates the extent of the necessary adjustment by appraising the dial angle between the 350° marking thereof and the operating position. The dial is again rotated to a low point and again returned toward the 350° point. If the thermostat again operates before the calibration temperature, or operates after the dial passes the calibration temperature, it would indicate that further dial adjustment was needed, and the mechanic would take appropriate action.

It will be noted that the necesary dial adjustments are made without removing the knob and dial assembly from the thermostat shaft. The calibrator is enabled to adjust the dial in one or another direction merely by turning it with one hand while using the other to hold the knob and shaft against rotation. When the adjustment of the dial on the shaft is completed, the knob and dial assembly is then stripped from the thermostat shaft and the nut 14 tightened securely. In view of the fact that the calibration pointer is non-rotatable relative to the thermostat shaft because of its key and slot relation therewith, and in view of the tight frictional engagement and the calibration device with the dial, there is no possibility of any subsequent displacement of the dial in use.

Under factory calbration conditions, where a quantity of thermostats from a particular production run are to be calibrated, it is sufficient to calibrate several thermostats taken at random from the production run, and then to observe the relation of the pointer 16 to the indicia on the rear face of the several dials. Usually, there will be a substantial conformity of settings, and it is practicable to assume that all of the other thermostats of that production lot require the same adjustment, which can then be made in advance of applying the dials to the thermostats.

While there has been described what is at present thought to be the preferred embodiment of the invention, it will be understood that various modifications may be made therein and it is intended to cover in the appended claims all such modifications as fall within the true spirit and scope of the invention.

We claim as our invention:
1. In combination,
    a knob having a shaft arranged to receive an adjustment shaft of an associated device which is to be manipulated by rotation of said knob,
    said knob shaft having a screw-threaded portion coaxial therewith;
    a dial rotatably mounted on said knob shaft;
    and combination calibration and dial securement means, said means comprising a resilient metal structure having an annular hub accepting the screw-threaded portion of said knob shaft,
    means for securing said hub against rotation on said knob shaft while permitting axial movement thereon,
    an indexing member extending radially from said hub for registry with indicia on a facing surface of said dial,
    and a nut on said screw-threaded shaft portion to urge said calibration means into tight frictional contact with said dial surface to secure the dial against rotation relative to said knob shaft, said hub being configurated to establish axial forces against said nut to lock the same against loosening.
2. In combination,
    a knob having a shaft portion arranged non-rotatably to receive an adjustment shaft of an associated device which is to be manipulated by rotation of said knob,
    said knob shaft having a screw-threaded portion;
    a dial rotatably mounted on said knob shaft;
    and combination calibration and dial securement means, said means comprising a resilient metal structure having an annular hub accepting the screw-threaded portion of said knob shaft, said hub having dial-engaging means projecting therefrom, means for keying said hub against rotation on said knob shaft while permitting axial movement thereon, an indexing member extending radially from said hub for registry with indicia on a facing surface of said dial, and a nut on said screw-threaded shaft portion to urge the dial-engaging means of said hub into tight frictional contact with said dial surface to secure the dial against rotation relative to said knob shaft, said calibration means, further, being arranged to establish axial forces against said nut to lock the same against loosening.

3. In combination, a knob having a shaft portion arranged non-rotatably to receive an adjustment shaft of an associated device which is to be manipulated by rotation of said knob;

a dial mounted on said knob shaft for rotation relative thereto;

and combination calibration and dial securement means, said means comprising a resilient metal structure having an annular hub accepting said knob shaft;

means for securing said hub against rotation on said knob shaft while permitting axial movement thereon, an indexing member extending radially from said hub for registry with indicia on a facing surface of said dial, securement means on said shaft portion manually adjustable to urge said calibration means into frictional contact with said dial surface to secure the dial against free rotation relative to said knob shaft while permitting manual rotation of said dial, and means on said hub responsive to further manual adjustment of said securement means to bite into said dial to effectively preclude any further rotation of said dial.

4. In combination, a knob having a body portion arranged to receive coaxial therewith an adjustment shaft of an associated device which is to be manipulated by rotation of said knob, said knob body portion being externally screw-threaded, a dial mounted about said screw-threaded portion for free rotation thereon, a combination calibration and dial-securement device, said device having an annular hub accepting the passage therethrough of said screw-threaded body portion, said hub and said screw-threaded portion being cooperatively shaped to preclude rotation of one relative to the other while permitting axial movement of said hub thereon, said calibration device having a resilient portion for frictional engagement with said dial, a nut on said screw-threaded body portion to tighten the engagement of said resilient portion with said dial surface to secure said dial against rotation relative thereto, and means on said calibration device exerting resilient axial forces against said nut to secure the same against loosening.

References Cited in the file of this patent

UNITED STATES PATENTS

| 2,179,281 | Coultrip | Nov. 7, 1939 |
| 2,995,105 | Maltby | Aug. 8, 1961 |

FOREIGN PATENTS

| 1,102,487 | France | May 11, 1955 |